US008498654B2

(12) United States Patent
Van Wyk et al.

(10) Patent No.: US 8,498,654 B2
(45) Date of Patent: Jul. 30, 2013

(54) METHOD AND SYSTEM FOR LOCATION-BASED COMMUNICATION

(75) Inventors: Ryan Van Wyk, St. Louis, MO (US); Scott Steinbrueck, St. Louis, MO (US); Phillip Jennings, Chicago, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1098 days.

(21) Appl. No.: 11/728,124

(22) Filed: Mar. 23, 2007

(65) Prior Publication Data
US 2008/0233956 A1 Sep. 25, 2008

(51) Int. Cl.
*H04W 24/00* (2009.01)

(52) U.S. Cl.
USPC .......... 455/456.1; 455/456.2; 455/456.3; 455/456.4; 455/456.5; 455/456.6; 455/404.2; 455/414.2; 455/457; 348/14.02; 348/14.01; 348/14.07

(58) Field of Classification Search
USPC ........ 379/201.06, 207.15, 207.13; 455/435.1, 455/3.05, 3.01, 3.06, 12.1; 725/99, 106, 122, 725/62; 348/14.02, 14.01, 14.07
See application file for complete search history.

(56) References Cited

U.S. PATENT DOCUMENTS

| | | | |
|---|---|---|---|
| 5,043,736 A | 8/1991 | Darnell et al. | |
| 5,696,815 A | 12/1997 | Smyk | |
| 6,304,573 B1 * | 10/2001 | Hicks, III | 370/401 |
| 6,603,973 B1 | 8/2003 | Foladare et al. | |
| 6,731,625 B1 | 5/2004 | Eastep et al. | |
| 6,766,174 B1 | 7/2004 | Kenyon | |
| 6,773,344 B1 | 8/2004 | Gabai et al. | |
| 6,882,709 B1 | 4/2005 | Sherlock et al. | |
| 6,919,803 B2 | 7/2005 | Breed | |
| 6,924,748 B2 | 8/2005 | Obradovich et al. | |
| 6,999,777 B1 | 2/2006 | Ganesh | |
| 7,127,261 B2 | 10/2006 | Van Erlach | |
| 7,127,488 B1 | 10/2006 | Scott et al. | |
| 2003/0016804 A1 * | 1/2003 | Sheha et al. | 379/201.06 |
| 2003/0027569 A1 | 2/2003 | Ejzak | |
| 2005/0014517 A1 * | 1/2005 | Holland et al. | 455/456.4 |
| 2005/0020241 A1 * | 1/2005 | Holland et al. | 455/404.1 |
| 2005/0180394 A1 * | 8/2005 | Kautz et al. | 370/352 |

(Continued)

FOREIGN PATENT DOCUMENTS

| | | |
|---|---|---|
| EP | 1204275 A2 | 5/2002 |
| GB | 2428942 | 2/2007 |

(Continued)

OTHER PUBLICATIONS

"International Application Serial No. PCT/US2008/057350, International Search Report mailed Feb. 13, 2009", 9 pgs.

(Continued)

*Primary Examiner* — Kamran Afshar
*Assistant Examiner* — Khalid Shaheed
(74) *Attorney, Agent, or Firm* — Parks IP Law LLC; Mickki D. Murray, Esq.

(57) ABSTRACT

A method and system for location-based communication. A selection of a source transceiver from a plurality of available transceivers associated with a source may be received. A telephony session may be initiated with the selected source transceiver. A mobile target transceiver may be geographically located. A result of the geographic location regarding the located mobile target transceiver may be provided. The located mobile target transceiver may be connected to the telephony session.

32 Claims, 11 Drawing Sheets

U.S. PATENT DOCUMENTS

| | | |
|---|---|---|
| 2006/0223518 A1* | 10/2006 | Haney .......................... 455/420 |
| 2007/0058569 A1 | 3/2007 | McMenamin et al. |
| 2007/0288627 A1* | 12/2007 | Abella et al. .................. 709/224 |
| 2009/0005015 A1* | 1/2009 | Shamilian et al. ......... 455/414.1 |

FOREIGN PATENT DOCUMENTS

| | | |
|---|---|---|
| WO | WO-0165815 | 9/2001 |
| WO | WO-03008992 A2 | 1/2003 |
| WO | WO-03032504 A2 | 4/2003 |
| WO | WO-03039172 A1 | 5/2003 |
| WO | WO-2008118690 A2 | 10/2008 |
| WO | WO-2008118690 A3 | 10/2008 |

OTHER PUBLICATIONS

"International Application Serial No. PCT/US2008/057350, Written Opinion mailed Feb. 13, 2009", 8 pgs.

"International Application Serial No. PCT/US2008/057350, Partial International Search Report mailed Sep. 25, 2008", 5 pgs.

* cited by examiner

METHOD AND SYSTEM FOR LOCATION-BASED COMMUNICATION

FIELD

This application relates to a method and system for communication, and more specifically to systems and methods for providing a location-based communication service for transceivers.

BACKGROUND

A geographic location of a user operating a mobile transceiver (e.g., a mobile phone) may be desired by another person. For example, a parent may seek to contact a child operating a mobile transceiver to obtain the geographic location of the child when the child has failed to check in with the parent, when the parent seeks to check up on a location of a child, or when the child is lost.

The person trying to contact the user of the mobile transceiver may attempt to establish communication with the user by placing a call to the user or sending a text message to user in an attempt to obtain the geographic location from the user. However, if the user does not accept the call or review the text message, the person ordinarily will be unable to obtain the current location from the user and may become frustrated and/or concerned. Even when the user accepts the call or responds to a text message, the user may be unaware of the current geographic location.

BRIEF DESCRIPTION OF DRAWINGS

Embodiments are illustrated by way of example and not limitation in the figures of the accompanying drawings, in which like references indicate similar elements and in which.

DETAILED DESCRIPTION

Example methods and systems for location-based communication are described. In the following description, for purposes of explanation, numerous specific details are set forth in order to provide a thorough understanding of example embodiments. It will be evident, however, to one skilled in the art that the present invention may be practiced without these specific details.

An application operating on a network may provide a location-based service for a number of users (e.g., a family). A first user (e.g., a parent) may use the application to receive and display of geographic location information about a target mobile transceiver (e.g., a mobile phone) associated with a second user (e.g., a child) on one or more of a number of different types of displays available to the first user. The geographic location information may be used by the first user to determine the location of the second user, present a map to the location of the second user with an optional address of the second user on a display, and/or determine whether the second user is in a permitted location.

The application may also initiate a telephony session between a source transceiver and the target mobile transceiver from a display such as an internet protocol television (IPTV) display. By establishing a telephony session, the first user may communication with the second user. The telephony session between the first user and the second user may optionally occur after the geographic location information of the second user is obtained, to enable the first user to follow up with the second user regarding the second user's geographic location. For example, the first user may provide directions to the second user (e.g., to return home) during the telephony session, may instruct the second user to leave the geographic location, or the like.

Figure 1:
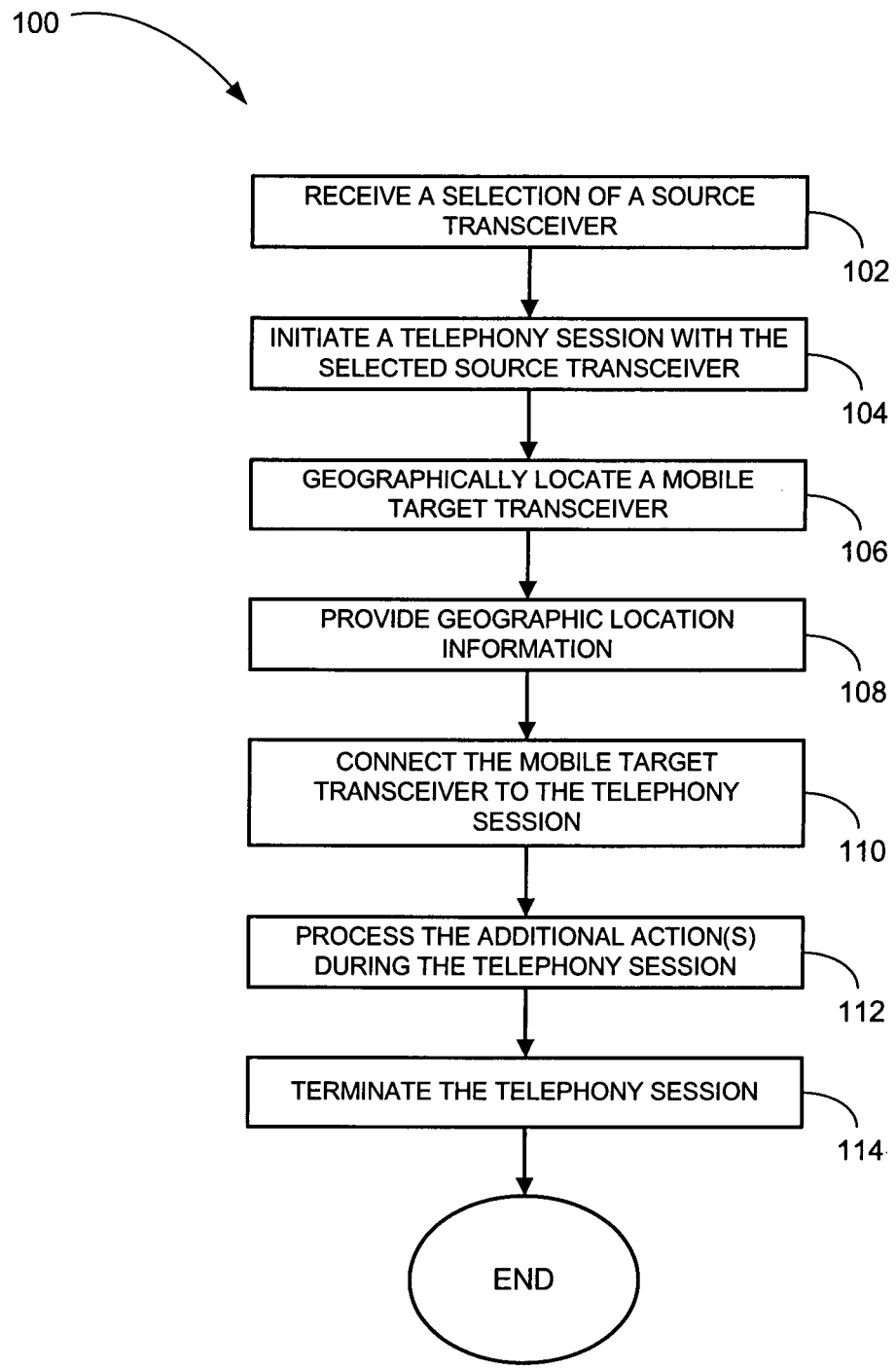
FIG. 1 is a flowchart illustrating a method for conducting a telephony session in accordance with an example embodiment.

FIG. 1 illustrates a method 100 for conducting a telephony session according to an example embodiment. The telephony session may be conducted in a location-based communication system between a source transceiver and a mobile target receiver.

A selection of a source transceiver from a plurality of available transceivers associated with a source (e.g., a first user) may be received at block 102. The source transceiver is a device capable of receiving and providing communications during a telephony session such as a receiver connected to an internet protocol television (IPTV) display, a source computing system, a source mobile device, a fixed-line phone, or the like. The source with which the source transceiver is associated includes a person, a group of persons, a family, or one or more persons associated with a user account (e.g., of a provider).

A listing of a plurality of available transceivers associated with a source may optionally be provided and a selection of a source transceiver from the plurality of available transceivers may be received in response to the listing.

By way of an example, a listing of a plurality of available transceivers associated with a source to a receiver device may be provided to a receiver device for presentation on an internet protocol television (IPTV) display. A selection of a source transceiver from the plurality of available transceivers associated with the source may be received through the receiver device.

The source may be directly associated with a first user that has made the selection or another user associated with the first user such as a family member or friend of the first user. For example, a number of source transceivers (e.g., a family's land-line phone and a parent's mobile phone) may be associated with an account of the first user and available for selection as the source transceiver during the operations at block 102.

In an example embodiment, the plurality of available transceivers associated with a source may be providing on a display of a device, where the device is not the selected source transceiver.

A telephony session may be initiated with the selected source transceiver at block 104. For example, a service application associated with a service provider may call the selected source transceiver to initiate the telephony session. Once the call is answered by a user operating the selected source transceiver, the telephony session may be initiated.

A mobile target transceiver (e.g., a mobile phone) may be geographically located at block 106. An example embodiment of geographically locating the mobile target receiver is described in greater detail below.

A result of the geographic location about the located mobile target receiver may be provided (e.g., for presentation on a display) at block 108.

In an example embodiment, the result of the geographic location may be provided on a display of a device. The device may be a different device than the source transceiver and the located mobile target transceiver.

The mobile target transceiver may be connected to the telephony session at block 110. Connecting the mobile target transceiver to the telephony session may enable communication between the source transceiver and the mobile target transceiver.

One or more additional actions may be processed during the telephony session at block 112. For example, one or more voice communications and/or one or more text messages may be processed between the source transceiver and the mobile target transceiver during the telephony session. The processing of the voice communications enables the first user and the second user to talk to one another during the telephony session (e.g., have a phone call), while the processing of the text messages enables the first user and the second user to communicate in text readable messages on their respective device displays (e.g., have a text chat). An example embodiment for processing the additional actions is described in greater detail below.

Once the processing of the additional actions during the operations of block 112 is complete, the telephony session may terminate at block 114.

Figure 2:
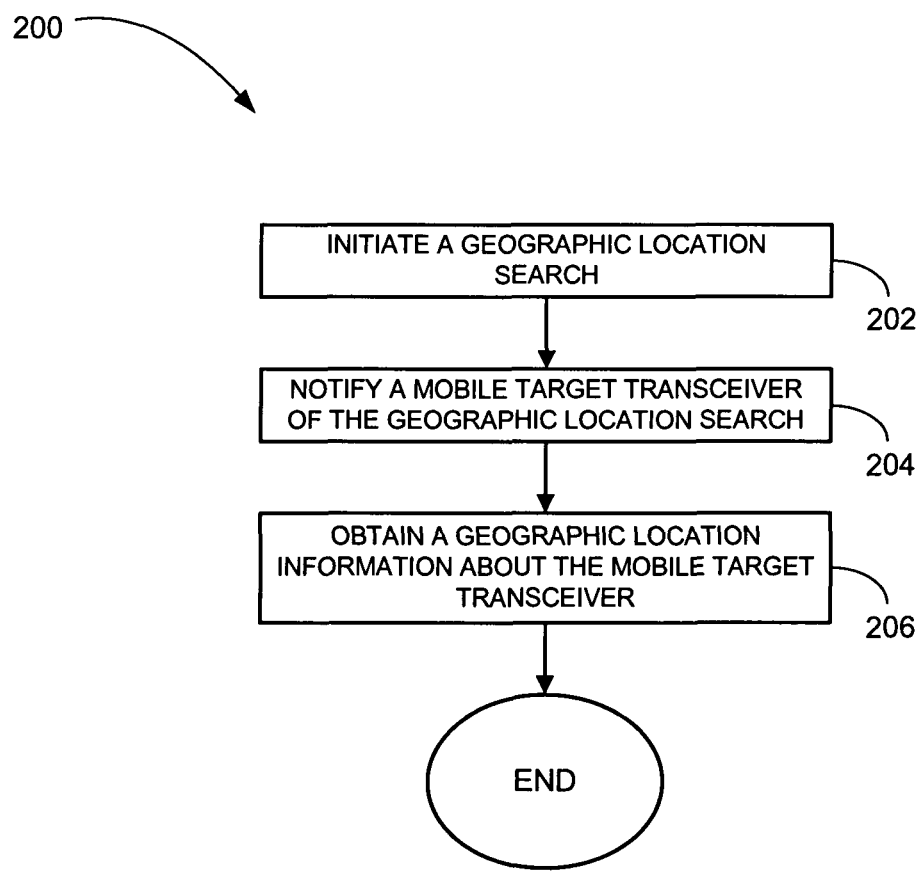
FIG. 2 is a flowchart illustrating a method for geographically locating a mobile target transceiver in accordance with an example embodiment.

FIG. 2 illustrates a method 200 for geographically locating a mobile target transceiver according to an example embodiment. In an example embodiment, the method 200 may be performed during the operations at block 106 (see FIG. 1).

A geographic location search may be initiated for a mobile target transceiver at block 202. For example, the geographic location search may request location data including GPS source data, GPS assisted data, triangulation data, and/or a cellular identification (ID) data in the form of location coordinates for the mobile target transceiver. The request for location data from the mobile target may optionally be from a mobile target transceiver according to a best efforts approach as described in greater detail below.

The mobile target transceiver may optionally be notified regarding initiation of the geographic location search at block 204. For example, a text message (e.g., a Short Message Service (SMS) message) may optionally be sent to the mobile target transceiver to notify a user of the mobile target transceiver that a location search is being conducted for the mobile target receiver.

Geographic location information about the mobile target transceiver may be obtained from the geographic location search at block 206. For example, GPS assisted data or other location data may be received from a mobile target transceiver and the geographic location information about the mobile target transceiver may be derived from the GPS assisted data or the other location data (e.g., according to a best efforts approach). Other types of location data may also be used.

In an example embodiment, the location data may be received from a mobile target transceiver and the geographic location information about the mobile target transceiver may be derived from the location data according to the best efforts approach. An example embodiment of deriving the location data according to a best efforts approach is described in greater detail below.

A log of the telephony session may optionally be created during the operations of method 200. The geographic location information obtained during the telephony session may optionally be associated with the log.

Figure 3:
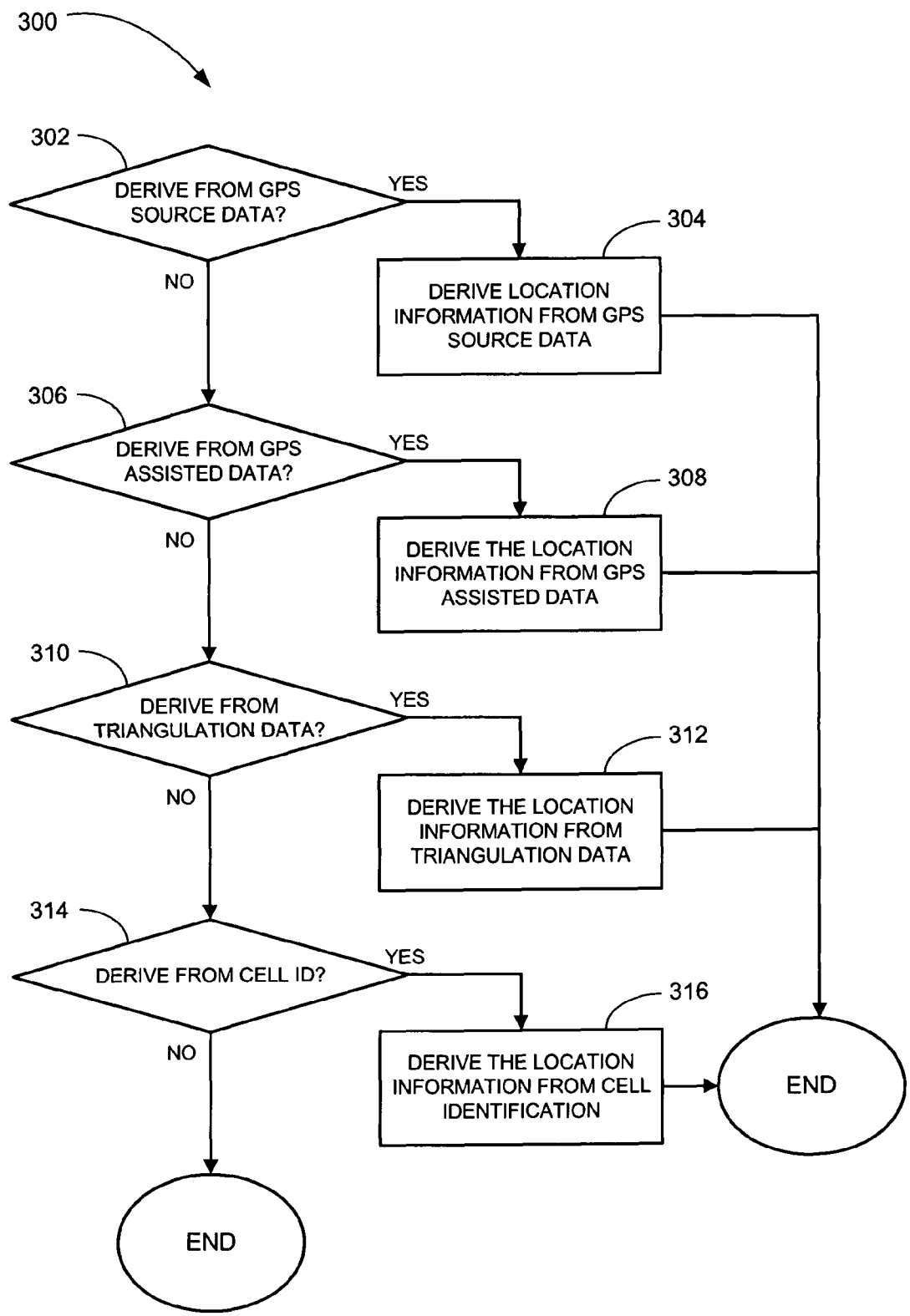
FIG. 3 is a flowchart illustrating a method for obtaining location data with a best efforts approach in accordance with an example embodiment.

FIG. 3 illustrates a method 300 for deriving location data with a best efforts approach according to an example embodiment. In an example embodiment, the method 300 may be performed during the operations at block 206 (see FIG. 2).

A determination may be made at decision block 302 whether to derive the geographic location information from GPS source data. If a determination is made to derive the geographic location information from GPS source data, the geographic location information is derived from GPS source data at block 304. For example, the geographic location information may be derived from the GPS source data when GPS source data is available and/or valid. If a determination is made not to derive the geographic location information from GPS source data at decision block 302, the method 300 may proceed to decision block 306.

At decision block 306, a determination may be made whether to derive the geographic location information from GPS assisted data. If a determination is made to derive the geographic location information from GPS assisted data, the geographic location information is derived from GPS assisted data at block 304. For example, the geographic location information may be derived from the GPS assisted data when GPS assisted data is available and/or valid. If a determination is made not to derive the geographic location information from GPS assisted data at decision block 306, the method 300 may proceed to decision block 310.

A determination may be made at decision block 310 whether to derive the geographic location information from triangulation data. If a determination is made to derive the geographic location information from triangulation data, the geographic location information is derived from triangulation data at block 312. For example, the geographic location information may be derived from the triangulation data when the triangulation data is available and/or valid. If a determination is made not to derive the geographic location information from the triangulation data at decision block 310, the method 300 may proceed to decision block 314.

At decision block 314, a determination may be made whether to derive the geographic location information from cell identification (ID) data. If a determination is made to derive the geographic location information from cell ID data, the geographic location information is derived from cell ID data at block 316. For example, the geographic location information may be derived from the cell ID data when the cell ID data is available and/or valid.

In an example embodiment, the geographic location information may be derived through operation of the method 300 from GPS source data when available and valid, from GPS assisted data when unable to derive the geographic location information from GPS source data (e.g., because GPS source data is unavailable or invalid), from triangulation data when unable to derive the geographic location information from the GPS source data and the GPS assisted data, and from the cell ID data when unable to derive the geographic location information from the GPS source data, the GPS assisted data, and the triangulation data in accordance with a best efforts approach. Other best efforts approach with more or less types of location data and/or in different orders may also be used.

Figure 4:
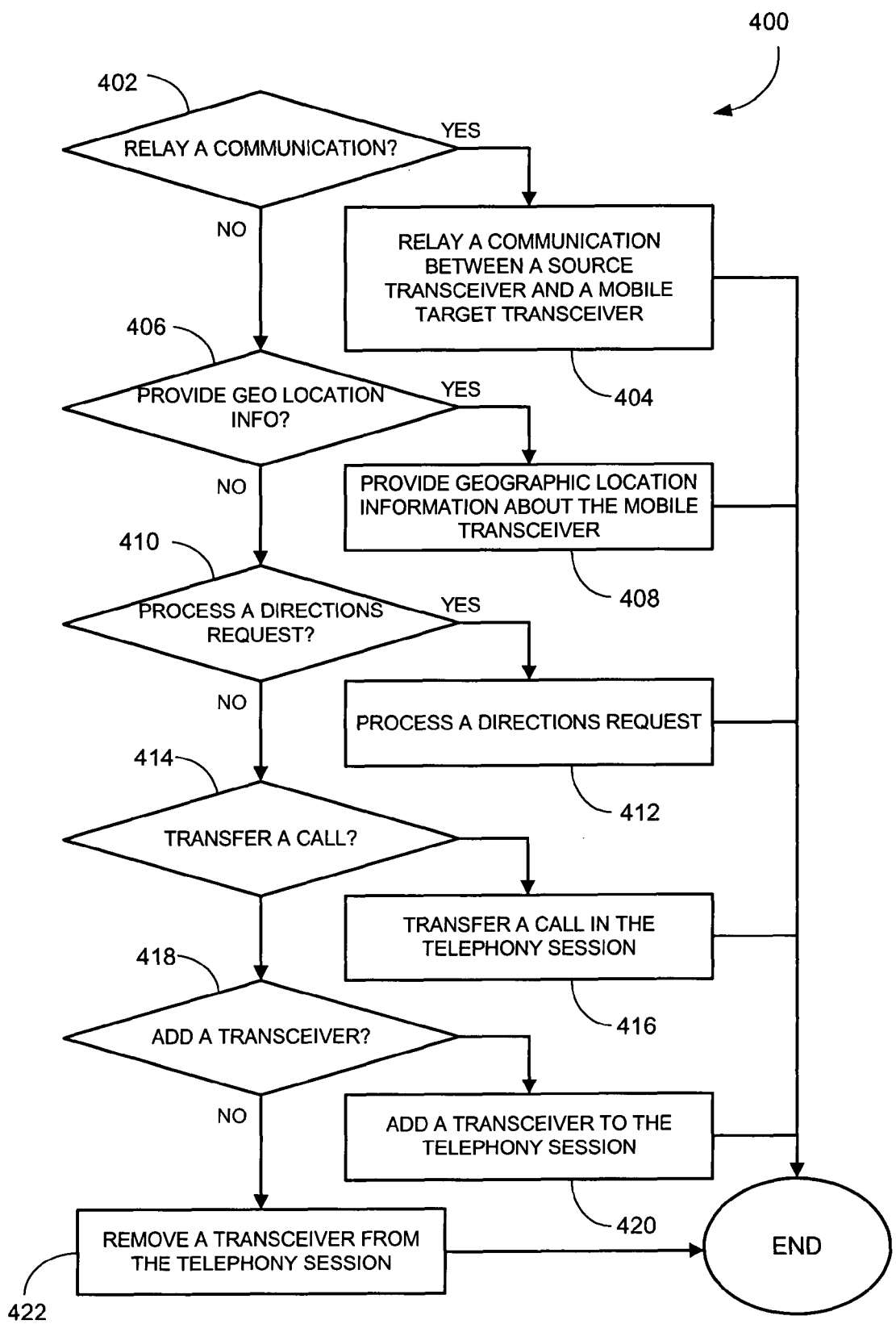
FIG. 4 is a flowchart illustrating a method for processing several actions in accordance with an example embodiment.

FIG. 4 illustrates a method 400 for processing several actions according to an example embodiment. In an example embodiment, the method 400 may be performed one or more times during the operations at block 112 (see FIG. 1).

A determination may be made at decision block 402 whether to relay a communication between a source transceiver and a mobile target transceiver. If a determination is made to relay the communication, the communication between the source transceiver and the mobile target transceiver may be relayed at block 404. For example, at least one voice communication and/or at least one text message may be relayed between the source transceiver and the mobile target transceiver during the telephony session. If a determination is made not to relay the communication at block 404, the method 400 may proceed to decision block 406.

At decision block 406, a determination may be made whether to update geographic location information about a mobile transceiver for display. If a determination is made to provide the geographic location information for display, the geographic location information may be provided at block 408. For example, the geographic location information provided during the operations at block 408 may update the geographic location information provided during the operations at block 108. If a determination is made not to present geographic information, the method 400 may proceed to decision block 410.

A determination may be made at decision block 410 whether to process a directions request. If a determination is made to process the directions request, the direction request may be processed at block 412. An example embodiment of processing the directions request is described in greater detail below. If a determination is made not to process a directions request, the method 400 may proceed to decision block 414.

At decision block 414, a determination may be made whether to transfer a call as an additional action in the telephony session. If a determination is made to transfer a call, the call may be transferred at block 416. For example, the source transceiver may be replaced with a replacement transceiver (e.g., an alternate source mobile transceiver or a fixed-line phone). If a determination is made at decision block 414 not to transfer a call, the method 400 may proceed to decision block 418.

A determination may be made at decision block 418 whether to add a transceiver (e.g., making a call a conference call) to the telephony session. If a determination is made to add a transceiver, a transceiver (e.g., an additional transceiver) is added to the telephony session at block 420.

If a determination is made at decision block 418 not to add a transceiver, a transceiver may be removed from the telephony session at block 422 (e.g., as the additional action).

Figure 5:
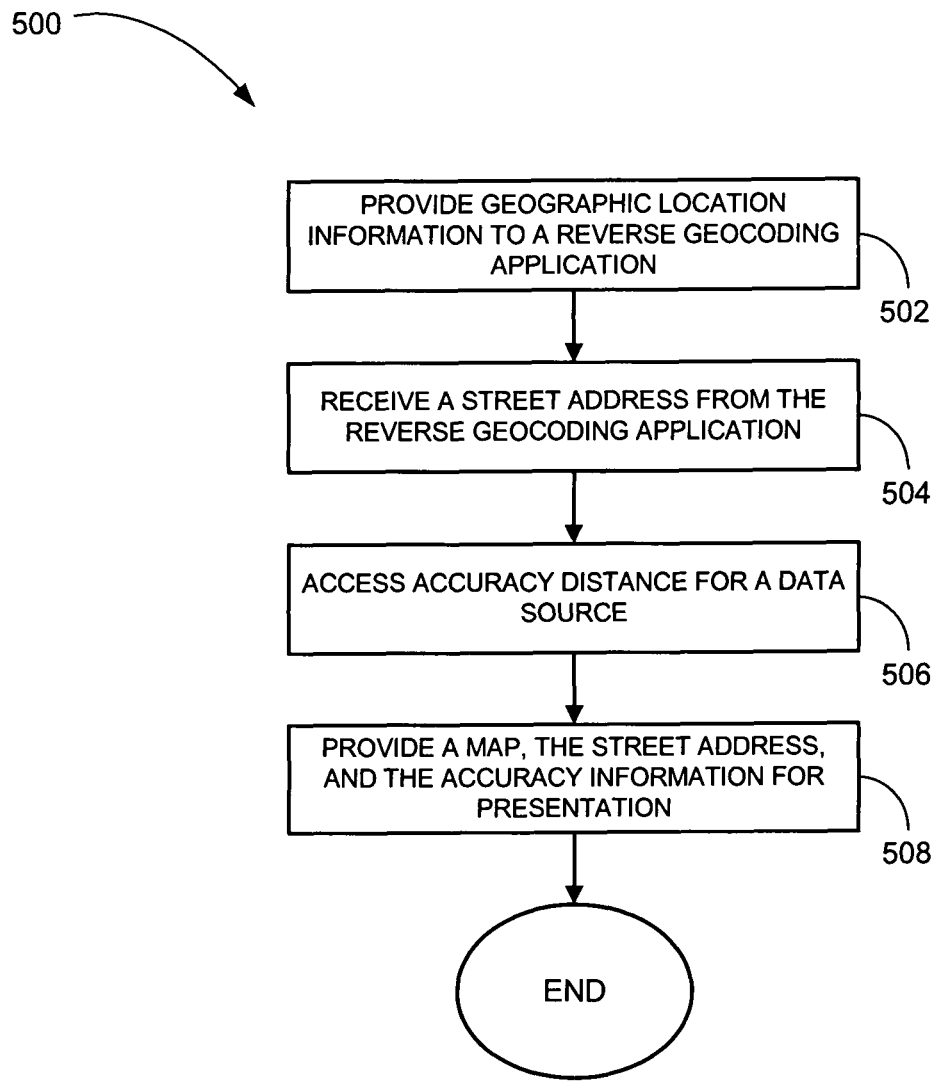
FIG. 5 is a flowchart illustrating a method for presenting geographic location information in accordance with an example embodiment.

FIG. 5 illustrates a method 500 for presenting geographic location information according to an example embodiment. In an example embodiment, the method 500 may be performed at block 108 and/or block 408 (see FIGS. 1 and 4).

The geographic location information may be provided to a reverse geocoding application at block 502. The street address may be received from the reverse geocoding application at block 504. The street address received from the reverse geocoding application may be an approximate street address which may, by way of example, be based on the accuracy of the geographic location information.

Accuracy information for a data source of the location data used to derive the geographic location information may optionally be accessed at block 506. For example, the GPS source data may be accurate to a certain amount of feet, while triangulation data maybe accurate to a different amount of feet.

The map, the approximate street address and/or the accuracy information may be provided for presentation (e.g., provided to a receiver device 102 for presentation on an IPTV display) at block 508.

In an example embodiment, a predefined location (e.g., a restaurant, a friend's house, a parent's house, or the like) associated with the mobile target transceiver may be accessed and the map provided for presentation may include the predefined location. For example, the predefined location in the form of coordinates and/or a location label may be selected by an operator of the source transceiver to enable display of a map with the predefined location.

Figure 6:
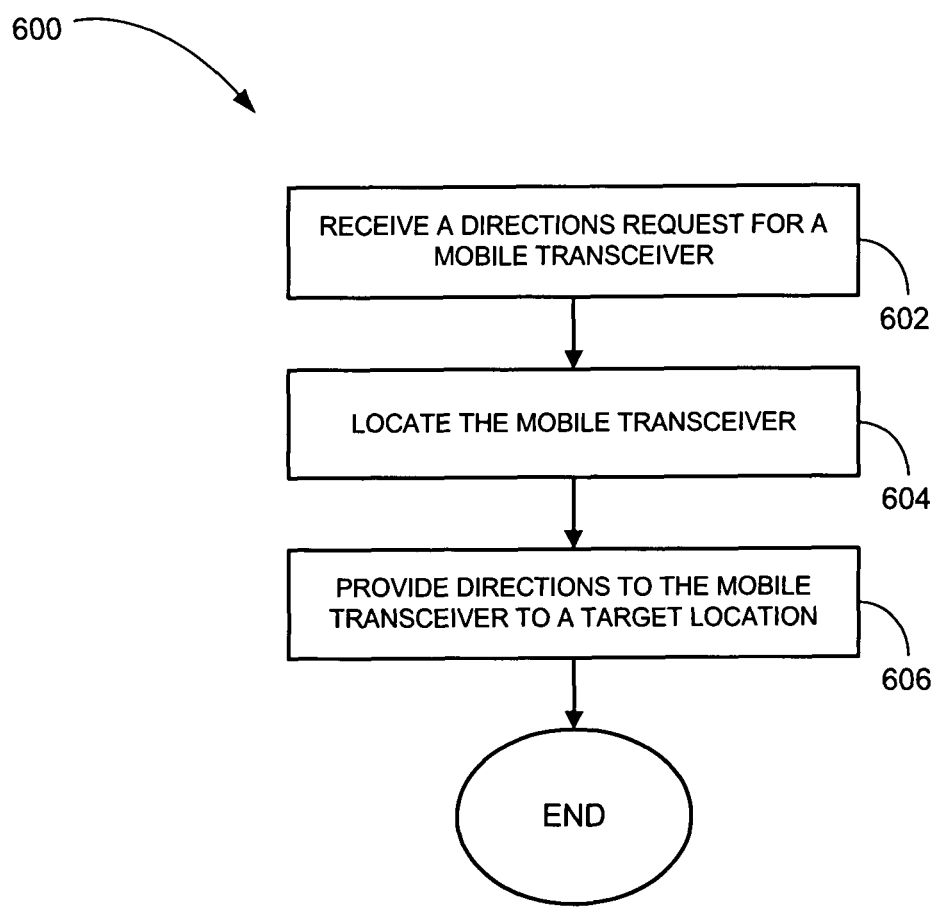
FIG. 6 is a flowchart illustrating a method for processing a direction request in accordance with an example embodiment.

FIG. 6 illustrates a method 600 for processing a directions request according to an example embodiment. In an example embodiment, the method 600 may be performed during the operations at block 412 (see FIG. 4).

A directions request may be received for a first mobile transceiver (e.g., the mobile target transceiver) at block 602. The directions request may be made by an operator of the source transceiver and/or the mobile target transceiver to receive directions (e.g., driving or walking directions) to a location.

The first mobile transceiver may be located at block 604. Directions between a location of the first mobile transceiver and a target location (e.g., where the operator of the source transceiver or mobile target transceiver may desire to travel) may be provided to the first mobile transceiver at block 606.

The target location may be a residence of a user of the mobile transceiver, as location of a source transceiver, a location of a receiver device, a predefined location, a dynamically selected location, or the like.

In an example embodiment, a second mobile transceiver may be located and directions between a location of the first mobile transceiver and the second mobile transceiver may be provided to the first mobile transceiver.

Figure 7:
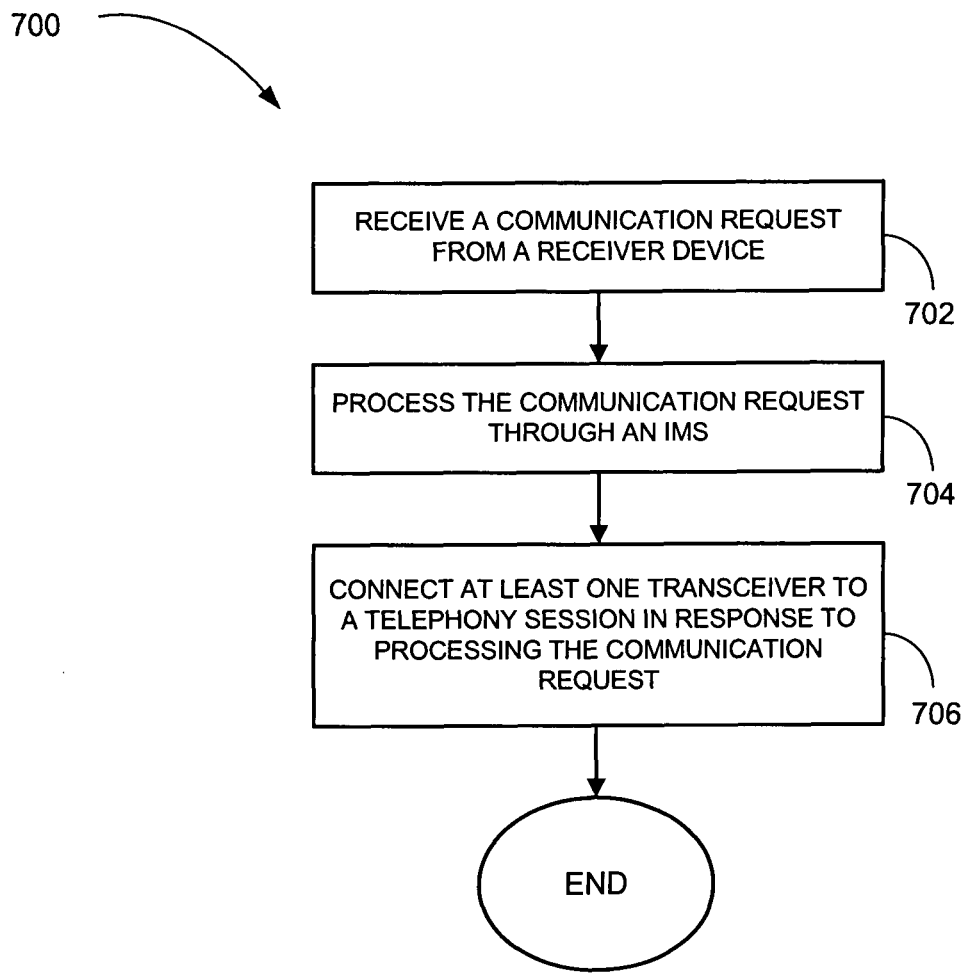
FIG. 7 is a flowchart illustrating a method for processing a communication request in accordance with an example embodiment.

FIG. 7 illustrates a method 700 for processing a communication request according to an example embodiment. The communication request may seek to initiate or modify a telephony session between a source transceiver and a mobile target transceiver.

A communication request may be received from a receiver device over a network at block 702. For example, the communication request may be a click-to-dial request, a call transfer request, or a conference call request. Other types of communication requests related to telephony sessions may also be received. The receiver device may be connected to an interactive television display (e.g., an IPTV display).

The communication request may be processed through an IP multimedia subsystem (IMS) to determine how the communication request relates to a telephony session at block 704. For example, the IMS may determine whether a transceiver should be added to an existing telephony session or whether a new telephony session should be initiated in response to processing the communication request.

At least one transceiver (e.g., a fixed-line telephone or a mobile phone) may be connected to the telephony session at block 706. The connection of the at least one transceiver may optionally be based on the processing of the communication request by the IMS. For example, a new call may be initiated, a call may be transferred to a transceiver, or an additional transceiver may be added to an existing call by connecting at least one transceiver to the telephony session.

Figure 8:
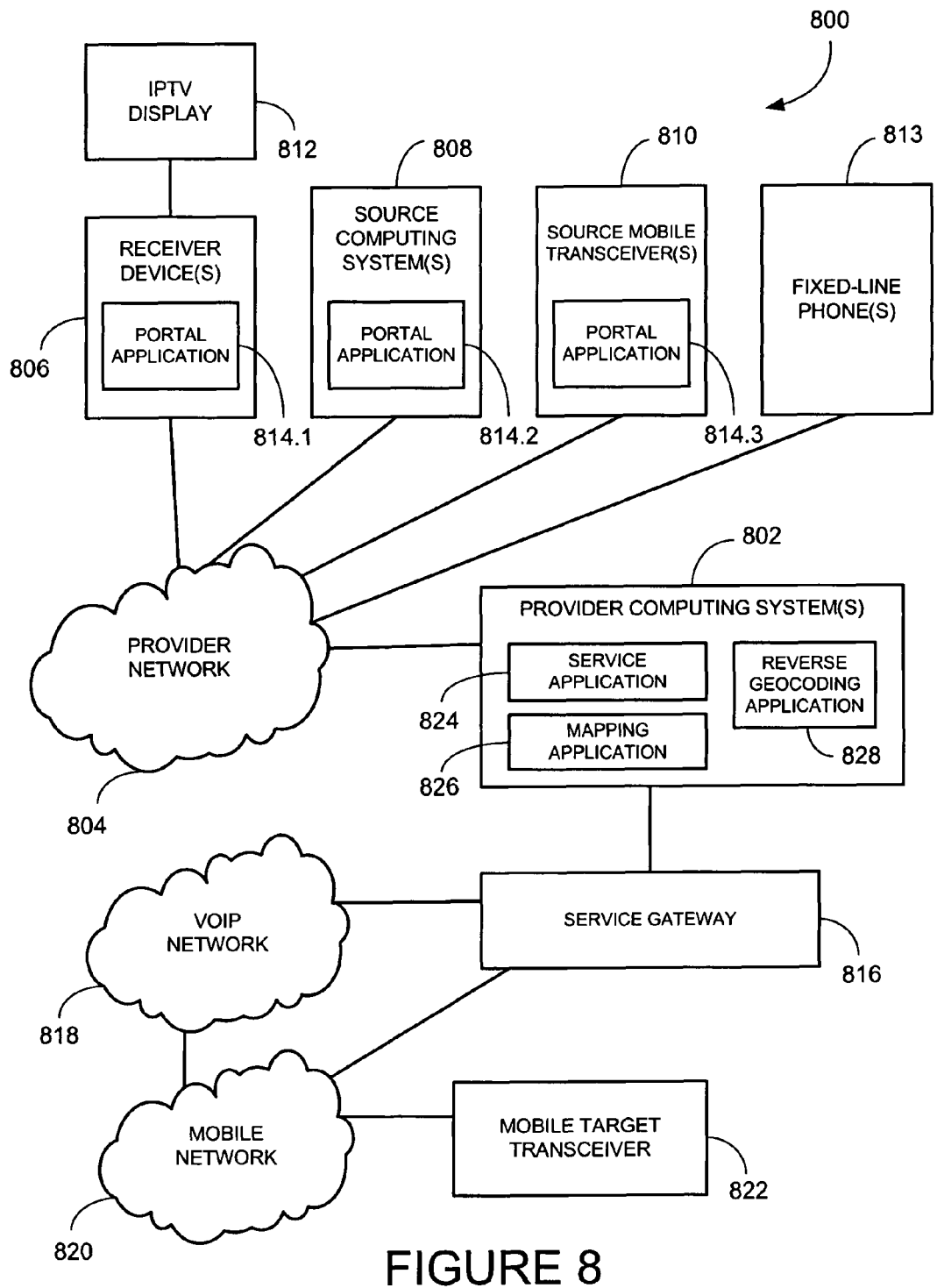
FIG. 8 is a block diagram of an example system for location-based communication.

FIG. 8 illustrates an example system 800 for location-based communication in which the methods 100-700 may be performed.

The system 800 includes a provider computing system 802 in communication with one or more source transceivers over a provider network 804. The provider network 804 may include a Global System for Mobile Communications (GSM) network, an Internet Protocol (IP) network, a Wireless Application Protocol (WAP) network, and/or a Wifi network. Other networks may also be used.

The source transceivers (e.g., user devices) may include one or more receiver devices 806, one or more source computing systems 808, one or more source mobile transceivers 880, and/or one or more fixed-line phones 813.

The receiver device 806 may communicate with the provider computing system 802 through a portal application 814.1. The receiver device 806 may present information received from the portal application 814.1 to a user on an IPTV display 812, and may receive information from a user through the IPTV display 812, an external device (e.g., a remote control), or directly on the receiver device 806. Examples of the receiver device 806 include a set-top box, a receiver card, and a computing system; however other devices may also be used. By way of example, a map displaying location information may be received by the receiver device 806 and presented on the IPTV display 812. The operator of the receiver device may select to geographically locate and call a user operating a mobile target transceiver device. The IPTV display 812 is an example of an interactive display, and other interactive displays may interchangeably be used.

The source computing system 808 may communicate with the provider computing system 802 through a portal application 814.2. Information received through the portal application 814.2 may be presented on the source computing system 808, and the portal application 814.2 may provide information received through the portal application 814.2 to the provider computing system 802.

The source mobile transceiver 810 (e.g., a mobile telephone) may communicate with the provider computing system 802 through a portal application 814.3. Information received through the portal application 814.3 may be presented on the source mobile transceiver 810, and the portal application 814.3 may provide information received through the portal application 814.3 to the provider computing system 802. The source mobile transceiver 880 may be used as a source transceiver for a telephony session.

The fixed-line phone 813 may be a transceiver used by the provider computing system 802 as a source transceiver for a telephony session. For example, the fixed-line phone may be a Voice Over IP (VOIP) phone or a public switch telephone network (PSTN) phone.

A service gateway 816 may act as a bridge between the provider computing system 802 and networks 818, 820. For example, the service gateway 816 may be used to retrieve location information regarding the mobile target receiver 822.

A VOIP network 818 and a mobile network 820 may be used to communicate with the mobile target transceiver 822. The location information may be received directly from the service gateway 816 or through use of information received from the service gateway 816.

The mobile target transceiver 822 may be a General Packet Radio Service (GPRS) enabled mobile phone; however other mobile phones and mobile transceivers may also be used.

The provider computing system 802 may include a service application 824, a mapping application 826, and/or a reverse geocoding application 828. The service application 824 may establish a telephony session with a source transceiver upon receiving a request from the portal application 814. An example embodiment of the service application 824 is described in greater detail below.

The mapping application 824 may provide a map from location information. The mapping application 824 may be a custom mapping application, YAHOO! Maps, GOOGLE Maps, MAPQUEST, or the like.

The reverse geocoding application 826 may determine a street address (e.g., an approximate street address) from geographic location information (e.g., location coordinates). The reverse geocoding application 826 may be an application provided by ESRI (e.g., ArcWeb); however other reverse geocoding applications may also be used.

Figure 9:
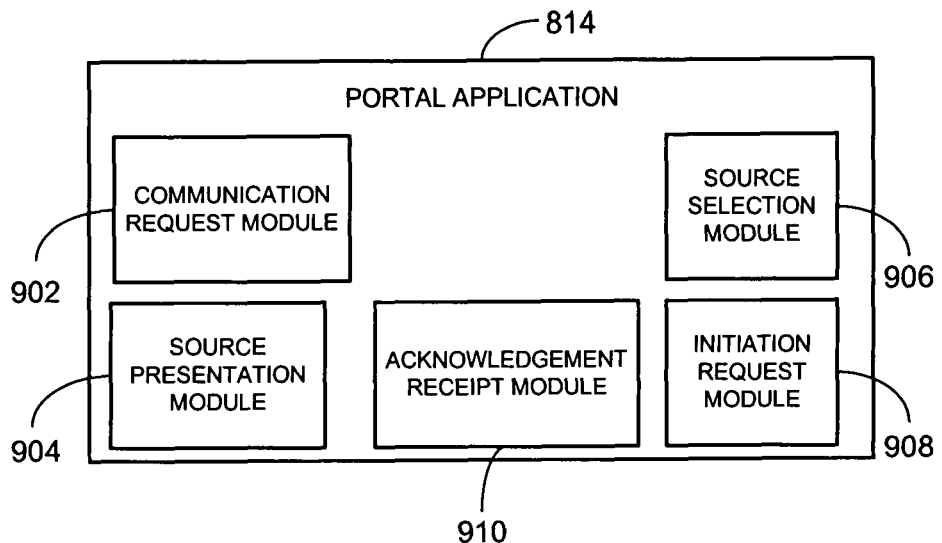
FIG. 9 is a block diagram of an example portal application that may be deployed in the example location-based communication of FIG. 8.

FIG. 9 illustrates an example portal application 814 (see FIG. 8). The portal application 814 may include a communication request module 902, a source presentation module 904, a source selection module 906, an initiation request module 908, and/or an acknowledgement receipt module 910.

The communication request module 902 receives a request from a user to communicate with the mobile target transceiver 822 (see FIG. 8).

The source presentation module 904 presents a plurality of source transceivers 806-813 (see FIG. 8) associated with a source. The source selection module 906 receives a selection of a source transceiver.

The initiation request module 908 sends a request for initiation of a telephony session between the source transceiver and the mobile target transceiver 192.

The acknowledgement receipt module 910 receives an acknowledgement of location of the mobile target transceiver 192 and initiation of the telephony session.

Figure 10:
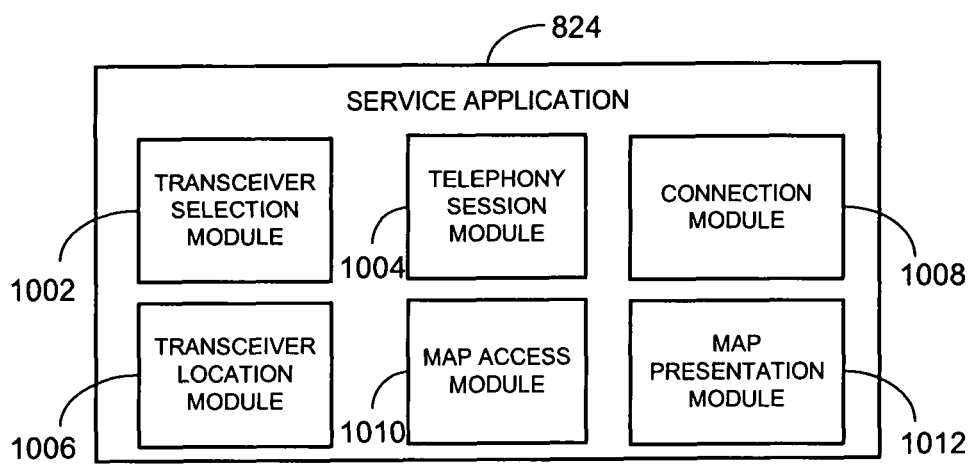
FIG. 10 is a block diagram of an example service application that may be deployed in the example location-based communication of FIG. 8.

FIG. 10 illustrates an example service application 824 (see FIG. 1). The service application 824 may include a transceiver selection module 1002, a telephony session module 1004, a transceiver location module 1006, a connection module 1008, a map access module 1010, and/or a map presentation module 1012.

The transceiver selection module 1002 receives a selection of a source transceiver from a plurality of available transceivers 806-813 associated with a source. The telephony session module 1004 initiates a telephony session with the source transceiver. The transceiver location module 1006 geographically locates a mobile target transceiver 822. The connection module 1008 connects the mobile target transceiver 822 to the telephony session.

The map access module 1010 accesses a map for a located mobile transceiver 822 using the result of the geographic location. The map presentation module 1012 presents the map of a located mobile target transceiver 822 to a requester.

Figure 11:
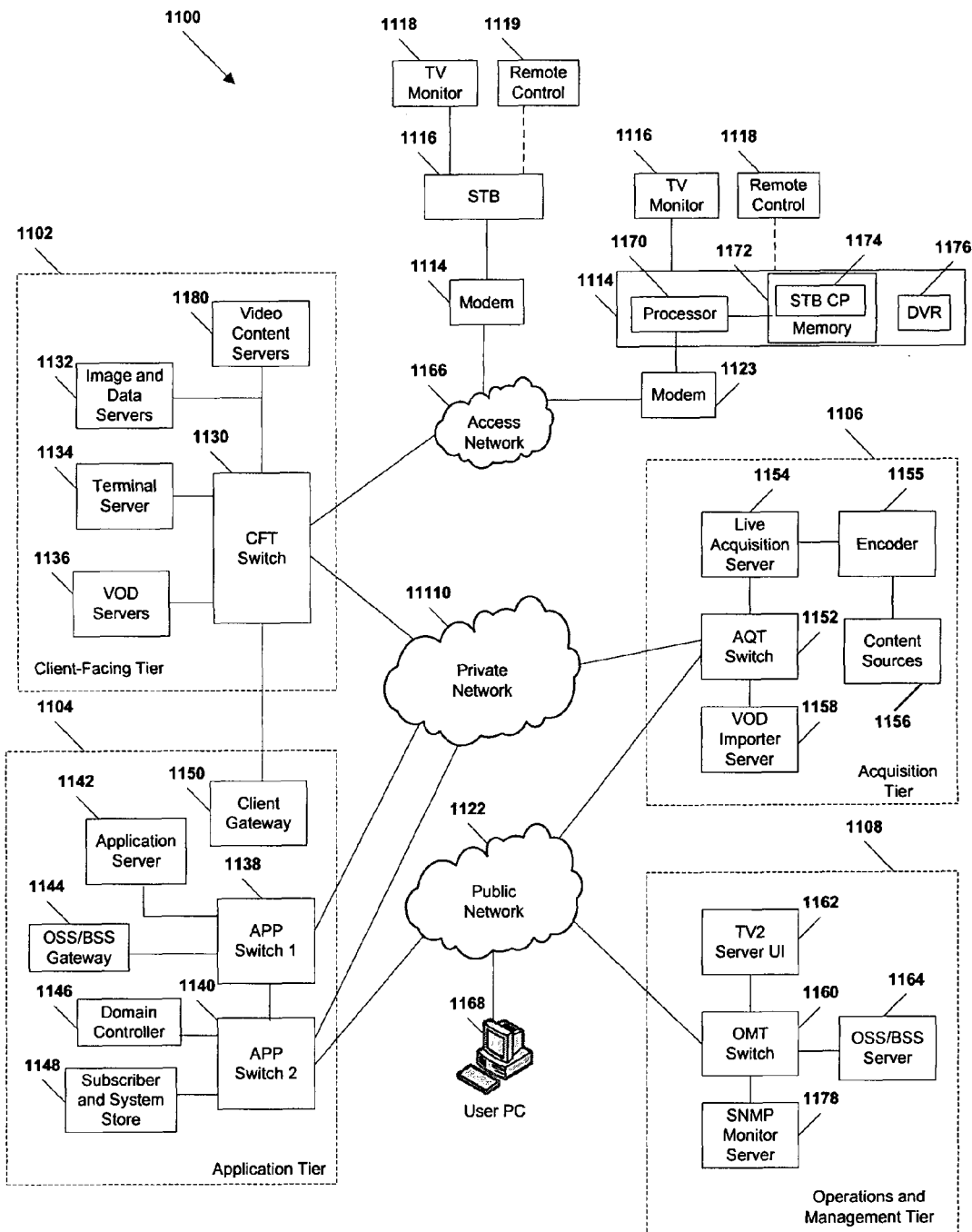
FIG. 11 is a block diagram of an IPTV system in accordance with an example embodiment.

FIG. 11 illustrates an example embodiment of an Internet Protocol Television (IPTV) system 1100 in which a source transceiver may be deployed for conducting location-based communication with a target mobile transceiver 822 (see FIG. 8). However, other types of sources and other types of systems may also be used.

The system 1100 as illustrated may include a client facing tier 1102, an application tier 1104, an acquisition tier 1106, and an operations and management tier 1108. Each tier 1102, 1104, 1106, 1108 is coupled to a private network 1110; to a public network 1122, such as the Internet; or to both the private network 1110 and the public network 1122. For example, the client-facing tier 1102 may be coupled to the private network 1110. Further, the application tier 1104 may be coupled to the private network 1110 and to the public network 1122. The acquisition tier 1106 may also be coupled to the private network 1110 and to the public network 1122. Additionally, the operations and management tier 1108 may be coupled to the public network 1122.

As illustrated in FIG. 11, the various tiers 1102, 1104, 1106, 1108 communicate with each other via the private network 1110 and the public network 1122. For instance, the client-facing tier 1102 may communicate with the application tier 1104 and the acquisition tier 1106 via the private network 1110. The application tier 1104 may also communicate with the acquisition tier 1106 via the private network 1110. Further, the application tier 1104 may communicate with the acquisition tier 1106 and the operations and management tier 1108 via the public network 1122. Moreover, the acquisition tier 1106 may communicate with the operations and management tier 1108 via the public network 1122. In a particular embodiment, elements of the application tier 1104, including, but not limited to, a client gateway 1150, may communicate directly with the client-facing tier 1102.

As illustrated in FIG. 11, the client-facing tier 1102 may communicate with user equipment via a private access network 1166, such as an Internet Protocol Television (IPTV) access network. In an illustrative embodiment, modems, such as a first modem 1114 and a second modem 1113 may be coupled to the private access network 1166. The client-facing tier 1102 may communicate with a first representative set-top box device 1116 via the first modem 1114 and with a second representative set-top box device 1114 via the second modem 1112. The client-facing tier 1102 may communicate with a large number of set-top boxes, such as the representative set-top boxes 1116, 1114, over a wide geographic area, such as a regional area, a metropolitan area, a viewing area, a designated market area or any other suitable geographic area, market area, or subscriber or customer group that may be supported by networking the client-facing tier 1102 to numerous set-top box devices. In an illustrative embodiment, the client-facing tier, or any portion thereof, may be included at a video head-end office.

In a particular embodiment, the client-facing tier 1102 may be coupled to the modems 1114, 1113 via fiber optic cables. Alternatively, the modems 1114 and 1113 may be digital subscriber line (DSL) modems that are coupled to one or more network nodes via twisted pairs, and the client-facing tier 1102 may be coupled to the network nodes via fiber-optic cables. Each set-top box device 1116, 1114 may process data received via the private access network 1166, via an IPTV software platform, such as Microsoft® TV IPTV Edition. In another embodiment, representative set-top boxes 1116, 1114 may receive data from private access network 1166 through RF and other cable and/or satellite based networks.

Additionally, the first set-top box device 1116 may be coupled to a first external display device, such as a first television monitor 1118, and the second set-top box device 1114 may be coupled to a second external display device, such as a second television monitor 1116. Moreover, the first set-top box device 1116 may communicate with a first remote control 1119, and the second set-top box device may communicate with a second remote control 1118.

In an example, non-limiting embodiment, each set-top box device 1116, 1114 may receive video content, which may include video and audio portions, from the client-facing tier 1102 via the private access network 1166. The set-top boxes 1116, 1114 may transmit the video content to an external display device, such as the television monitors 1118, 1116. Further, the set-top box devices 1116, 1114 may each include a STB processor, such as STB processor 1170, and a STB memory device, such as STB memory 1172, which is accessible to the STB processor 1170. In one embodiment, a computer program, such as the STB computer program 1174, may be embedded within the STB memory device 1172. Each set-top box device 1116, 1114 may also include a video content storage module, such as a digital video recorder (DVR) 1176. In a particular embodiment, the set-top box devices 1116, 1114 may communicate commands received from the remote control devices 1119, 1118 to the client-facing tier 1102 via the private access network 1166.

In an illustrative embodiment, the client-facing tier 1102 may include a client-facing tier (CFT) switch 1130 that manages communication between the client-facing tier 1102 and the private access network 1166 and between the client-facing tier 1102 and the private network 1110. As shown, the CFT switch 1130 is coupled to one or more image and data servers 1132 that store still images associated with programs of various IPTV channels. The image and data servers 1132 may also store data related to various channels, e.g., types of data related to the channels and to programs or video content displayed via the channels. In an illustrative embodiment, the image and data servers 1132 may be a cluster of servers, each of which may store still images, channel and program-related data, or any combination thereof. The CFT switch 1130 may also be coupled to a terminal server 1134 that provides terminal devices with a connection point to the private network 1110. In a particular embodiment, the CFT switch 1130 may also be coupled to one or more video-on-demand (VOD) servers 1136 that store or provide VOD content imported by the IPTV system 1100. In an illustrative, non-limiting embodiment, the VOD content servers 1180 may include one or more unicast servers.

The client-facing tier 1102 may also include one or more video content servers 1180 that transmit video content requested by viewers via their set-top boxes 1116, 1114. In an illustrative, non-limiting embodiment, the video content servers 1180 may include one or more multicast servers.

As illustrated in FIG. 11, the application tier 1104 may communicate with both the private network 1110 and the public network 1122. The application tier 1104 may include a first application tier (APP) switch 1138 and a second APP switch 1140. In a particular embodiment, the first APP switch 1138 may be coupled to the second APP switch 1140. The first APP switch 1138 may be coupled to an application server 1142 and to an OSS/BSS gateway 1144. In a particular embodiment, the application server 1142 may provide applications to the set-top box devices 1116, 1114 via the private access network 1166, which enable the set-top box devices 1116, 1114 to provide functions, such as display, messaging, processing of IPTV data and VOD material, etc. In a particular embodiment, the OSS/BSS gateway 1144 includes operation systems and support (OSS) data, as well as billing systems and support (BSS) data. In one embodiment, the OSS/BSS gateway may provide or restrict access to an OSS/BSS server 1164 that stores operations and billing systems data.

Further, the second APP switch 1140 may be coupled to a domain controller 1146 that provides web access, for example, to users via the public network 1122. For example, the domain controller 1146 may provide remote web access to IPTV account information via the public network 1122, which users may access using their personal computers 1168. The second APP switch 1140 may be coupled to a subscriber and system store 1148 that includes account information, such as account information that is associated with users who access the system 1100 via the private network 1110 or the public network 1122. In a particular embodiment, the application tier 1104 may also include a client gateway 1150 that communicates data directly with the client-facing tier 1102. In this embodiment, the client gateway 1150 may be coupled directly to the CFT switch 1130. The client gateway 1150 may provide user access to the private network 1110 and the tiers coupled thereto.

In a particular embodiment, the set-top box devices 1116, 1114 may access the IPTV system 1100 via the private access network 1166, using information received from the client gateway 1150. In this embodiment, the private access network 1166 may provide security for the private network 1110. User devices may access the client gateway 1150 via the private access network 1166, and the client gateway 1150 may allow such devices to access the private network 1110 once the devices are authenticated or verified. Similarly, the client gateway 1150 may prevent unauthorized devices, such as hacker computers or stolen set-top box devices from accessing the private network 1110, by denying access to these devices beyond the private access network 1166.

For example, when the first representative set-top box device 1116 accesses the system 1100 via the private access network 1166, the client gateway 1150 may verify subscriber information by communicating with the subscriber and system store 1148 via the private network 1110, the first APP switch 1138, and the second APP switch 1140. Further, the client gateway 1150 may verify billing information and status by communicating with the OSS/BSS gateway 1144 via the private network 1110 and the first APP switch 1138. In one embodiment, the OSS/BSS gateway 1144 may transmit a query across the first APP switch 1138, to the second APP switch 1140, and the second APP switch 1140 may communicate the query across the public network 1122 to the OSS/BSS server 1164. After the client gateway 1150 confirms subscriber and/or billing information, the client gateway 1150 may allow the set-top box device 1116 access to IPTV content and VOD content. If the client gateway 1150 is unable to verify subscriber information for the set-top box device 1116, e.g., because it is connected to an unauthorized twisted pair, the client gateway 1150 may block transmissions to and from the set-top box device 1116 beyond the private access network 1166.

As indicated in FIG. 11, the acquisition tier 1106 includes an acquisition tier (AQT) switch 1152 that communicates with the private network 1110. The AQT switch 1152 may also communicate with the operations and management tier 1108 via the public network 1122. In a particular embodiment, the AQT switch 1152 may be coupled to a live acquisition server 1154 that receives television or movie content, for example, from content sources 1156 through an encoder 1155. In a particular embodiment during operation of the IPTV system, the live acquisition server 1154 may acquire television or movie content. The live acquisition server 1154 may transmit the television or movie content to the AQT switch 1152 and the AQT switch 1152 may transmit the television or movie content to the CFT switch 1130 via the private network 1110.

Further, the television or movie content may be transmitted to the video content servers 1180, where it may be encoded, formatted, stored, or otherwise manipulated and prepared for communication to the set-top box devices 1116, 1114. The CFT switch 1130 may communicate the television or movie content to the modems 1114, 1113 via the private access network 1166. The set-top box devices 1116, 1114 may receive the television or movie content via the modems 1114, 1113, and may transmit the television or movie content to the television monitors 1118, 1116. In an illustrative embodiment, video or audio portions of the television or movie content may be streamed to the set-top box devices 1116, 1114.

Further, the AQT switch may be coupled to a video-on-demand importer server 1158 that stores television or movie content received at the acquisition tier 1106 and communicates the stored content to the VOD server 1136 at the client-facing tier 1102 via the private network 1110. Additionally, at the acquisition tier 1106, the video-on-demand (VOD) importer server 1158 may receive content from one or more VOD sources outside the IPTV system 1100, such as movie studios and programmers of non-live content. The VOD importer server 1158 may transmit the VOD content to the AQT switch 1152, and the AQT switch 1152, in turn, may communicate the material to the CFT switch 1130 via the private network 1110. The VOD content may be stored at one or more servers, such as the VOD server 1136.

When user issue requests for VOD content via the set-top box devices 1116, 1114, the requests may be transmitted over the private access network 1166 to the VOD server 1136, via the CFT switch 1130. Upon receiving such requests, the VOD server 1136 may retrieve the requested VOD content and transmit the content to the set-top box devices 1116, 1114 across the private access network 1166, via the CFT switch 1130. The set-top box devices 1116, 1114 may transmit the VOD content to the television monitors 1118, 1116. In an illustrative embodiment, video or audio portions of VOD content may be streamed to the set-top box devices 1116, 1114.

FIG. 11 further illustrates that the operations and management tier 1108 may include an operations and management tier (OMT) switch 1160 that conducts communication between the operations and management tier 1108 and the public network 1122. In the embodiment illustrated by FIG. 1, the OMT switch 1160 is coupled to a TV2 server 1162. Additionally, the OMT switch 1160 may be coupled to an OSS/BSS server 1164 and to a simple network management protocol (SNMP) monitor 1170 that monitors network devices within or coupled to the IPTV system 1100. In a particular embodiment, the OMT switch 1160 may communicate with the AQT switch 1152 via the public network 1122.

In an illustrative embodiment, the live acquisition server 1154 may transmit the television or movie content to the AQT switch 1152, and the AQT switch 1152, in turn, may transmit the television or movie content to the OMT switch 1160 via the public network 1122. In this embodiment, the OMT switch 1160 may transmit the television or movie content to the TV2 server 1162 for display to users accessing the user interface at the TV2 server 1162. For example, a user may access the TV2 server 1162 using a personal computer (PC) 1168 coupled to the public network 1122.

Figure 12:
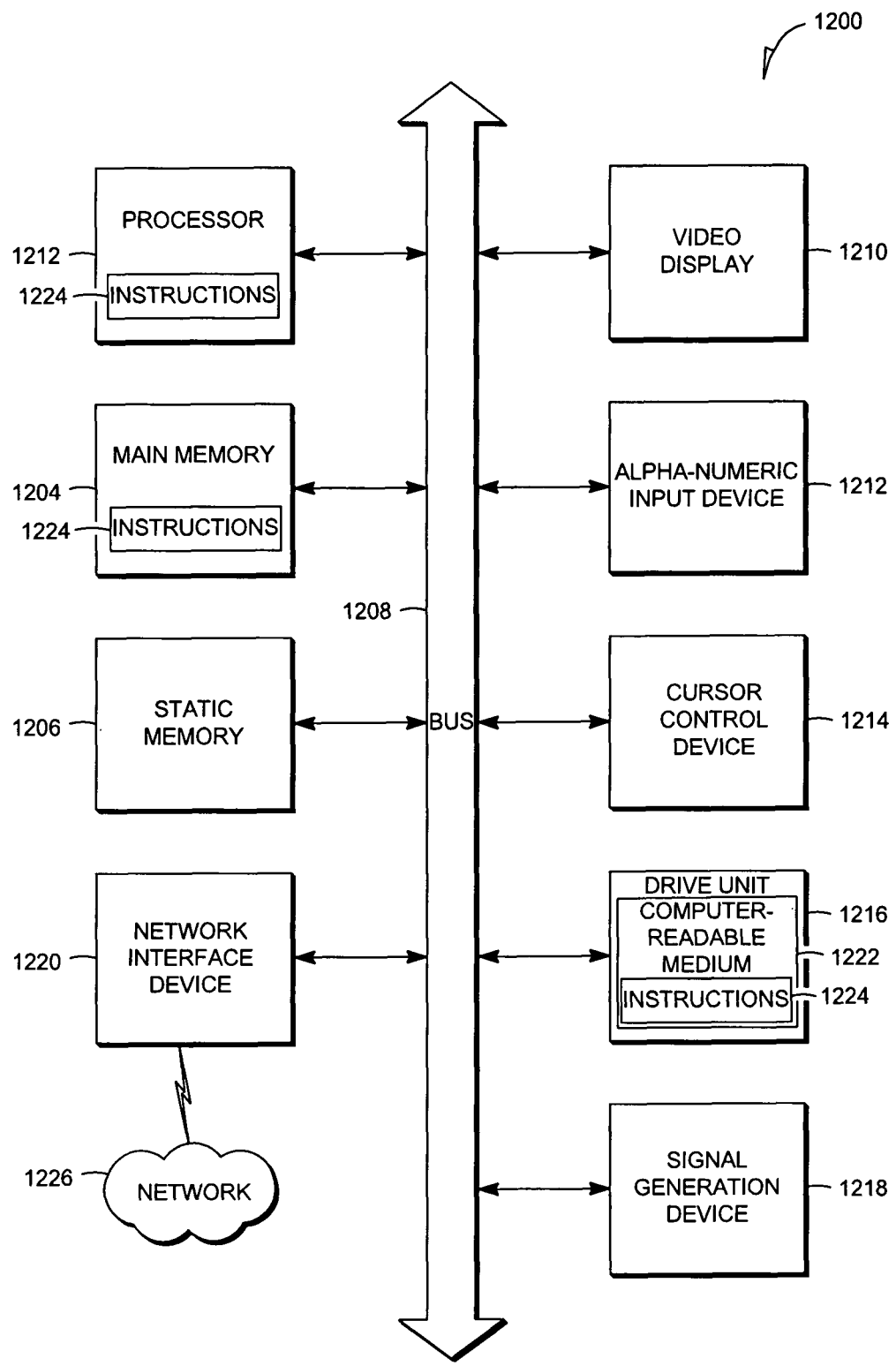
FIG. 12 illustrates a diagrammatic representation of machine in the example form of a computer system within which a set of instructions, for causing the machine to perform any one or more of the methodologies discussed herein, may be executed.

FIG. 12 shows a diagrammatic representation of machine in the example form of a computer system 1200 within which a set of instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1212 (e.g., a central processing unit (CPU), a graphics processing unit (GPU) or both), a main memory 1204 and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard), a user interface (UI) navigation device 1214 (e.g., a mouse), a disk drive unit 1216, a signal generation device 1218 (e.g., a speaker) and a network interface device 1220.

The disk drive unit 1216 includes a machine-readable medium 1222 on which is stored one or more sets of instructions and data structures (e.g., software 1224) embodying or utilized by any one or more of the methodologies or functions described herein. The software 1224 may also reside, completely or at least partially, within the main memory 1204 and/or within the processor 1212 during execution thereof by the computer system 1200, the main memory 1204 and the processor 1212 also constituting machine-readable media.

The software 1224 may further be transmitted or received over a network 1250 via the network interface device 1220 utilizing any one of a number of well-known transfer protocols (e.g., HTTP).

While the machine-readable medium 1222 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical media, and magnetic media.

Although an embodiment of the present invention has been described with reference to specific example embodiments, various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
receiving, by a system having a processor, an indication of a user-chosen source transceiver chosen from a listing of a plurality of source transceivers, wherein each of the plurality of source transceivers is associated with a source and configured to facilitate a telephony session between the source transceiver and a mobile target transceiver, and the user-chosen source transceiver is a type of device selected from a group consisting of a mobile device, an internet-protocol-television device, a computing device, and a land-line device;
initiating, by the system, a telephony session between the system and the user-chosen source transceiver;
determining, by the system, a geographic location of the mobile target transceiver;
providing, by the system, the geographic location to a destination; and
connecting, by the system, the mobile target transceiver to the telephony session.

2. The method of claim 1, wherein determining the geographic location comprises:
initiating a geographic location search for the mobile target transceiver; and
obtaining, by way of the geographic location search, geographic location information indicating the geographic location.

3. The method of claim 2, wherein initiating the geographic location search comprises notifying the mobile target transceiver of initiation of the geographic location search.

4. The method of claim 2, wherein initiating the geographic location search comprises requesting, of the mobile target transceiver, location data.

5. The method of claim 4, wherein obtaining the geographic location information comprises:
   receiving, from the mobile target transceiver, the location data; and
   deriving, from the location data, the geographic location information.

6. The method of claim 2, further comprising:
   creating a log of the telephony session initiated; and
   associating the geographic location information obtained during the telephony session, to the log.

7. The method of claim 1, further comprising:
   accessing, using the geographic location, a map; and
   providing the map for presentation by way of the internet-protocol-television device.

8. The method of claim 7, wherein:
   the method further comprises:
      sending the geographic location to a reverse-geocoding application configured to determine a street address from using the result; and
      receiving, from the reverse-geocoding application, the street address; and
   providing the geographic location comprises sending the map and the street address to a receiver device, being in operative communication with the internet-protocol-television device, for presentation on the internet-protocol-television device.

9. The method of claim 1, further comprising:
   receiving a directions request relating to the geographic location of the mobile target transceiver; and
   providing, to the target mobile transceiver, directions connecting the geographic location and a target location.

10. The method of claim 9, wherein the target location includes a type of location selected from a group consisting of a location of the user-chosen source transceiver, a location of a network device, and a predefined location.

11. The method of claim 1, further comprising processing, during the telephony session, a voice communication between the user-chosen source transceiver and the mobile target transceiver, wherein the processing includes transferring the voice communication, received from a first device of the user-chosen source transceiver and the mobile target transceiver, to a second device of the user-chosen source transceiver and the mobile target transceiver.

12. The method of claim 1, further comprising processing, during the telephony session, a text communication between the user-chosen source transceiver and the mobile target transceiver, wherein the processing includes transferring the text communication, received from a first device of the user-chosen source transceiver and the mobile target transceiver, to a second device of the user-chosen source transceiver and the mobile target transceiver.

13. The method of claim 1, further comprising transferring, during the telephony session, a call from the user-chosen source transceiver to a new source transceiver.

14. The method of claim 1, further comprising adding an additional transceiver to the telephony session to create a conference call.

15. The method of claim 1, wherein the geographic location includes location coordinates.

16. The method of claim 1, wherein the mobile target transceiver is a general-packet-radio-service-enabled mobile phone.

17. The method of claim 1, wherein the source, being associated with the user-chosen source transceiver, is selected from a group consisting of a person, a family, and a non-family group of persons.

18. The method of claim 1, wherein:
   the destination is a component selected from a group consisting of:
      the internet-protocol-television device; and
      a receiver device in operative communication with the internet-protocol-television device; and
   the geographic location is provided to the destination for presentation by way of the Internet-protocol-television device.

19. A non-transitory computer-readable medium comprising computer-executable instructions that, when executed by a processor, cause the processor to perform operations comprising:
   receiving an indication of a user-chosen source transceiver chosen from a listing of a plurality of source transceivers, wherein each of the plurality of source transceivers is associated with a source and configured to facilitate a telephony session between the source transceiver and a mobile target transceiver, and the user-chosen source transceiver is a type of device selected from a group consisting of a mobile device, an internet-protocol-television device, a computing device, and a land-line device;
   initiating a telephony session between the user-chosen source transceiver and a system of which computer-readable storage device is a part;
   determining a geographic location of the mobile target transceiver; providing the geographic location to a destination; and connecting the mobile target transceiver to the telephony session.

20. The non-transitory computer-readable medium of claim 19, wherein the operation of determining the geographic location comprises:
   initiating a geographic location search for the mobile target transceiver; and
   obtaining, by way of the geographic location search, geographic location information indicating the geographic location.

21. The non-transitory computer-readable medium of claim 20, wherein the operation of initiating the geographic location search comprises notifying the mobile target transceiver of initiation of the geographic location search.

22. The non-transitory computer-readable medium of claim 20, wherein the operations further comprise:
   creating a log of the telephony session initiated; and
   associating the geographic location information, obtained during the telephony session initiated, to the log.

23. The non-transitory computer-readable medium of claim 19, wherein the operations further comprise:
   receiving a directions request relating to the geographic location of the mobile target transceiver; and
   providing, to the target mobile transceiver, directions between the geographic location and a target location;
   wherein the target location includes a type of location selected from a group consisting of a location of the user-chosen source transceiver, a location of a network device, and a predefined location.

24. The non-transitory computer readable medium of claim 19, wherein the source, being associated with the user-chosen source transceiver, is selected from a group consisting of a person, a family, and a non-family group of persons.

25. The non-transitory computer-readable medium of claim 19, wherein:
   the destination is a component selected from a group consisting of: the internet-protocol-television device; and a receiver device in operative communication with the internet-protocol-television device; and the geographic location is provided to the destination for presentation by way of the internet-protocol-television device.

26. A system comprising: a processor; and a non-transitory computer-readable medium comprising computer-executable instructions that, when executed by the processor, cause the processor to perform operations comprising:

receiving an indication of a user-chosen source transceiver chosen from a listing of a plurality of source transceivers, wherein each of the plurality of source transceivers is associated with a source and configured to facilitate a telephony session between the source transceiver and a mobile target transceiver, and the user-chosen source transceiver is a type of device selected from a group consisting of a mobile device, an internet-protocol-television device, a computing device, and a land-line device;

initiating a telephony session between the user-chosen source transceiver and a system of which the computer-readable storage device is a part;

determining a geographic location of the mobile target transceiver; providing the geographic location to a destination; and connecting the mobile target transceiver to the telephony session.

27. The system of claim 26, wherein the operation of determining the geographic location comprises:

initiating a geographic location search for the mobile target transceiver; and obtaining, by way of the geographic location search, geographic location information indicating the geographic location.

28. The system of claim 27, wherein the operation of initiating the geographic location search comprises notifying the mobile target transceiver of initiation of the geographic location search.

29. The system of claim 27, wherein the operations further comprise:

creating a log of the telephony session initiated; and associating the geographic location information, obtained during the telephony session initiated, to the log.

30. The system of claim 26, wherein the operations further comprise:

receiving a directions request relating to the geographic location of the mobile target transceiver; and providing, to the target mobile transceiver, directions between the geographic location and a target location;

wherein the target location includes a type of location selected from a group consisting of a location of the user-chosen source transceiver, a location of a network device, and a predefined location.

31. The system of claim 26, wherein the source, being associated with the user-chosen source transceiver, is selected from a group consisting of a person, a family, and a non-family group of persons.

32. The system of claim 26, wherein:

the destination is a component selected from a group consisting of:

the internet-protocol-television device; and a receiver device in operative communication with the internet-protocol-television device; and the geographic location is provided to the destination for presentation by way of the internet-protocol-television device.

* * * * *